Patented Mar. 4, 1947

2,416,880

UNITED STATES PATENT OFFICE 2,416,880

POLYVINYL ALCOHOL INSOLUBILIZED WITH CHLORINATED POLYMERIC ETHERS

Carl Walter Mortenson, Wilmington, Del., assignor to E. I. du Pont de Nemours & Company, Wilmington, Del., a corporation of Delaware No Drawing. Application October 23, 1943, Serial No. 507,479

14 Claims. (Cl. 260—32)

This invention relates to polyvinyl alcohols and the insolubilization thereof.

The polyvinyl alcohols are useful materials, but for many applications their solubility in water is a decided disadvantage. Attempts have been made to insolubilize polyvinyl alcohol, e. g., with dimethylolurea or trimethylolmelamine. While these are satisfactory in certain applications, they produce an insoluble polyvinyl alcohol that becomes considerably swollen and weak after exposure to water at normal temperatures or after a shorter exposure to hot water. Thus, films of polyvinyl alcohol insolubilized with dimethylolurea swell 45 to 75% or even more after immersion in water at 25° C. for half an hour. Certain applications of polyvinyl alcohol demand a higher degree of water resistance than can be obtained with the use of the above insolubilizers. Furthermore, it is particularly advantageous when the insolubilization of polyvinyl alcohols can be effected at normal or slightly above normal temperatures.

This invention has as an object the provision of a process for insolubilizing polyvinyl alcohols. A further object comprises shaped polyvinyl alcohol articles of high resistance to swelling by water. Another object is the preparation of potentially reactive, insolubilizable polyvinyl alcohol solutions. Other objects will appear hereinafter.

These objects are accomplished by the following invention wherein a polyvinyl alcohol is rendered resistant to water by treatment with an alpha-polyhalogenated linear polymeric ether, i. e., a linear polymeric ether having in the molecule a plurality of halogen atoms on carbon atoms alpha to the ether oxygens.

The process of this invention may readily be carried out by treating an aqueous solution of a polyvinyl alcohol with an alpha-polyhalogenated linear polymeric ether, preferably an alpha-polychlorinated linear polymeric ether. The preferred polyhalogenated polymeric ethers are wholly aliphatic. To hasten reaction and solution of the ether, the mixture is heated with stirring at 50-60° C. until it is homogeneous. Films, coatings or threads and the like of the desired dimensions may then be prepared from the bubble-free solution by casting or spinning methods as required. Films flowed from such reaction mixtures soon become insoluble on standing at ordinary temperatures and show good resistance to boiling water. The superiority of the alpha-polyhalogenated polymeric ethers for promoting a high degree of insolubilization of polyvinyl alcohol is best illustrated by the fact that the conventional agents used for this treatment, including dimethylolurea, formaldehyde or trimethylolmelamine, give satisfactory insolubility only after heat treatment of the dried film. This superiority is again illustrated by the fact that films insolubilized with conventional agents, such as dimethylolurea, swell 45–75% after immersion in water at 25° C. for 30 minutes as compared to a corresponding swell of only 0–30% for films insolubilized with alpha-polyhalogenated linear polymeric ethers. While the degree of water resistance obtained in the above manner with these halogenated polymeric ethers is adequate for many purposes, it may be increased in the films showing some swelling in water by heating the dried films at elevated temperatures. The preferred amount of these cross-linking agents to be used varies depending on a number of factors, including after-treatment and application of the product. In general, however, good insolubility is realized using 5–15% of the reagent based on the solid polyvinyl alcohol present.

The alpha-polyhalogenated linear polymeric ethers can be prepared by halogenating linear polymeric ethers. The preparation of these compounds is illustrated by the following examples in which parts are by weight.

Example A

One hundred parts of polyethylene oxide (molecular weight about 1500) was suspended in 300 parts of carbon tetrachloride and chlorine gas was passed into the stirred reaction mixture heated to 50–60° C. for a period of about two hours. During the chlorination the reaction mixture was illuminated with light from a 100 watt tungsten lamp. At the end of the reaction period the solvent and excess chlorine were removed from the product by heating under vacuum. Chlorinated polyethylene oxide which resulted contained 8.6% chlorine.

Example B

One hundred parts of polydioxolane (molecular weight about 10,000) was suspended in 300 parts of carbon tetrachloride and chlorine gas was passed into the stirred reaction mixture heated to 50–60° C. for a period of about two hours. During the chlorination the reaction mixture was illuminated with light from a 100 watt tungsten lamp. At the end of the reaction period the solvent and excess chlorine were removed from the product by heating under vacuum. The chlorinated polydioxolane which resulted contained 25.96 chlorine.

Example C

Chlorine was passed into a solution of one hundred parts of polyethylene oxide (molecular weight about 4000) suspended in four hundred parts of carbon tetrachloride at 50-60° C. until the amount of chlorine consumed was slightly greater than the amount of chlorine required for one atom of chlorine to each methylene group. The carbon tetrachloride and excess chlorine were distilled under vacuum. The chlorinated polyethylene oxide resulting contained 47.6% chlorine.

The more detailed practice of the invention is illustrated by the following examples, wherein parts given are by weight. There are, of course, many forms of the invention other than these specific embodiments.

Example I

Five parts of polyvinyl alcohol is dissolved in 45 parts of water, the resultant solution is heated to 50-60° C., and 0.5 part of chlorinated polyethylene oxide containing 47.6% chlorine, as prepared in Example C above is added. The resultant mixture is stirred at the above temperature for about ten minutes or until solution is effected. The clear solution so obtained is then cast as a film on a glass plate. The clear film obtained after evaporation of the solvent is insoluble in boiling water.

The dried film is baked for one hour at 100° C. whereby a still further improvement in water resistance is obtained. For example, prior to baking and after immersion for five minutes in water at 25° C., the wet film has a tensile strength of 700 lbs./sq. in. whereas the heat treated film similarly tested has a wet tensile strength of 1200 lbs./sq. in. at break. In comparison, an unbaked film modified with dimethylolurea has a negligible tensile strength after five minutes immersion as above, while the corresponding heat treated film has a wet tensile strength of about 700 lbs./sq. in. at break. The baked film insolubilized with chlorinated polyethylene oxide retains its shape and swells only to a slight degree even after being immersed in boiling water for periods of one hour or longer. A film insolubilized with dimethylolurea swells about 75% or more under similar treatment and loses its shape, becoming stringy and gummy.

Example II

To 50 parts of a 10% aqueous solution of polyvinyl alcohol is added 0.5 part of chlorinated polyethylene oxide containing 8.6% chlorine as prepared in Example A above. The resultant mixture is stirred and heated to 50-60° C. for ten minutes or until it becomes homogeneous. Four parts of pyridine is then added, the pH of the resultant solution being raised from 1.4-3.0 to 5.7-6.5. The solution is allowed to stand at room temperature until free of bubbles and then is cast in the form of a thin film, which, after drying, is baked at a temperature of 100° C. for one hour. The resulting insolubilized polyvinyl alcohol film possesses excellent water resistance and is comparable to that obtained in Example I above.

By the use of acid acceptors such as pyridine, it is possible to coat a fabric with polyvinyl alcohol and insolubilize the latter with alpha-polyhalogenated linear polymeric ethers without tendering the cellulosic substrate. Thus, cotton fabric coated with polyvinyl alcohol and insolubilized in the above manner using pyridine as an acid acceptor possesses a tear resistance of 2.5 pounds and a tensile strength of 67 pounds per linear inch as compared to corresponding values for uncoated fabric of 2.6 pounds and 50 pounds per linear inch, respectively. Coated fabric insolubilized in the absence of pyridine shows a tear resistance of only 0.1 pound and a tensile strength of only 16 pounds per linear inch.

Example III

A mixture comprising 45 parts of water and 5 parts of polyvinyl alcohol is heated with stirring to 50-60° C., and 0.5 part of chlorinated polydioxolane containing 25.96% chlorine as prepared in Example B above is added. The solution is stirred for 5-10 minutes and then allowed to stand until cool and free from bubbles. The resultant composition is cast upon a glass plate, and the thin film so formed is dried at room temperature and then baked at 100° C. for one hour, whereby the film is rendered insoluble in water and inorganic solvents. By adding four parts of pyridine to the solution before casting or shaping the article desired, the acidity of the solution is lowered, so that fabrics can be impregnated without appreciable tendering.

Example IV

A mixture containing 50 parts of a 10% solution of polyvinyl alcohol in water and 0.5 part of the product obtained by chlorinating polyvinyl methyl ether is heated at 50-60° C. with stirring until a clear homogeneous solution is obtained. The resultant composition is cast in the form of a thin film on glass and after drying at ordinary temperatures is heated at 95-110° C. for one hour. This treatment furthers the reaction between the polyvinyl alcohol and the chlorinated polyvinyl methyl ether and produces a film which is insoluble in cold or boiling water and in organic solvents. Thus, after immersion in water for 24 hours at 25° C., the film swells only 0-4%, and after immersion in boiling water for periods of one hour or longer, the film still retains its shape and strength and does not become stringy and weak as do films insolubilized with conventional agents such as dimethylolurea.

Example V

Five parts of hydrolyzed ethylene/vinyl acetate interpolymer (containing one ethylene group per 16-20 vinyl acetate units) is dissolved in a 90/10 water/methanol solution and the resultant solution is cooled to room temperature. To this is added 0.5 part of chlorinated polyethylene oxide containing 8.6% chlorine as prepared in Example A above, and the mixture is stirred at room temperature until a homogeneous solution is obtained. A clear film is then cast on a glass plate from this solution and the solvent is allowed to evaporate at room temperature. The dry film is insoluble in a 90/10 mixture of water/methanol at the boiling point. Resistance to swelling may be increased by baking the dried film for one hour at 100° C. Pyridine may be employed as an acid acceptor in the above solution without lowering the effectiveness of the chlorinated polyethylene oxide. In addition to rendering the hydrolyzed ethylene/vinyl acetate interpolymer insoluble in aqueous media, this treatment raises the temperature for this polymer at which tensile strength is negligible to above 350° C. in comparison with 220° C. for an untreated sample. Likewise the tack point is raised from 170-180° C. for the untreated material to 213° C. for the treated polymer.

The above examples illustrate the invention which is generic to the treatment of a polyvinyl alcohol with an alpha-polyhalogenated linear polymeric ether, that is, a linear polymeric ether having a plurality of halogen atoms on alpha carbons. The alpha carbons of the linear polymeric ethers are the carbons attached to ether oxygen. The alpha-polyhalogenated linear polymeric ethers may be prepared by halogenation of linear polymeric ethers having a plurality of hydrogen-bearing carbons attached to ether oxygen. Examples of those linear polymeric ethers include polydioxolane and polydioxolane derivatives, e. g., the dioxolane-polyhydric alcohol polymers of Gresham SN 392,124 filed May 6, 1941, Loder SN 395,366 filed May 27, 1941, and Loder and Gresham SN 392,128 filed May 6, 1941; those ether resins of Arvin U. S. Patent 2,060,715 containing hydrogen on the alpha carbons, and capable of forming alpha-halogenated ethers, polymeric vinyl ethers, e. g., polymeric methyl vinyl ether, polymeric ethyl vinyl ether, polymeric n-butyl vinyl ether, polymeric phenyl vinyl ether, polymeric methoxyethyl vinyl ether; polymethylene oxides (polyoxymethylene) obtainable, for example, from formaldehyde; polyethylene oxide and polypropylene oxide. Copolymers having ether linkages may be employed including methyl vinyl ether/vinyl chloride copolymers, ethyl vinyl ether/styrene copolymers, ethyl vinyl ether/indene copolymers, and methyl vinyl ether/isobutylene copolymers. Examples of the alpha-polyhalogenated linear polymeric ethers which may be employed include the alpha-polybrominated, alpha-polyiodinated, alpha-polyfluorinated, and mixed alpha-polyhalogenated linear polymeric ethers. Thus the bromination product of a partially chlorinated polyethylene oxide, alpha-polybrominated polyvinyl methyl ether, or alpha-polybrominated polyethylene oxide may be employed. Similarly, alpha-polyiodinated polyethylene oxide or alpha-polyfluorinated polyethylene oxide may be employed. The alpha-polychlorinated linear polymeric ethers are preferred, because they may be produced more readily and are more economical.

The alpha-polyhalogenated linear polymeric ethers may readily be prepared. The chloro ethers may be prepared as previously illustrated in Examples A, B, and C by passing chlorine into a suspension of the linear polymeric ether in an inert solvent such as carbon tetrachloride. Heat, stirring, and irradiation may be employed to facilitate the halogenation. The bromides and fluorides may be prepared by suitable reactions. Thus, the chlorinated polymeric ether may be reacted with aluminum bromide to give bromides and with an antimony tri- or pentafluoride to give fluorides. The iodinated compounds may be obtained by reaction of metallic iodides such as sodium or potassium iodide with the chlorinated polymers. Such iodinated products may be reacted with silver fluoride or mercuric fluoride to give the fluorinated polymeric ethers.

The extent of halogen substitution may vary over wide limits. Chlorinated polyethylene oxide, for example, which contains 8.6% chlorine is an effective insolubilizing agent when used according to the above procedures, as is also a derivative containing 47.9% chlorine. Likewise, a sample of chlorinated polydioxolane containing 25.96% chlorine has been found to be highly effective. To be effective, however, the halogenated polymeric ethers should contain at least 1% halogen and preferably 5% halogen by weight, depending upon the molecular weight of the polymeric ether and must have at least three halogen atoms per mol on alpha carbons.

The polyvinyl alcohols which may be employed include polyvinyl alcohol per se prepared by essentially complete saponification of esters of polyvinyl alcohol, e. g., polyvinyl acetate, and also polyvinyl alcohols prepared by partial hydrolysis of the esters. Any desired type of polyvinyl alcohol of any conventional viscosity may be employed in this invention. These types of polyvinyl alcohols may be employed in either aqueous or organic media. However, if partially hydrolyzed products are to be used in aqueous media, it is, of course, necessary that the hydrolysis be carried out to the extent that water solubility be produced. Other types of polyvinyl alcohols not necessarily water-soluble but nevertheless operable in this invention are hydrolyzed interpolymers of ethylene and vinyl acetate, hydrolyzed methyl methacrylate/vinyl acetate interpolymers, hydrolyzed vinyl acetate/vinyl chloride interpolymers, hydrolyzed vinyl acetate/styrene interpolymers, and hydrolyzed vinyl acetate/vinylidene chloride interpolymers. The process of this invention is also applicable to polyvinyl alcohol derivatives in which at least 1% and up to 95% of the hydroxyls are reacted with aldehydes or ketones giving hydroxyl-containing polyvinyl acetals or ketals respectively. For example, polyvinyl alcohol may be partially reacted with aldehydes, e. g., formaldehyde, acetaldehyde, furfuraldehyde, benzaldehyde, or butyraldehyde, or with ketones such as cyclohexanone, methyl cyclohexanone, or 1-ketotetrahydronaphthalene to produce derivatives still containing free hydroxyl groups. In any event the polyvinyl alcohol or derivative must contain at least 3 hydroxyl groups to be effectively insolubilized by the polyhalogenated ethers.

While water is a preferred reaction medium and the water-soluble polyvinyl alcohols form a preferred class of materials to which the process of this invention may be applied, the invention is not limited to the use of this medium nor to the use of water-soluble polyvinyl alcohols. Thus, media other than water, such as dioxane, chloroform, hydrocarbons, halogenated hydrocarbons, or mixtures of these may be employed depending on the polyvinyl alcohol employed. It is also possible to bring about insolubilization in the total absence of solvents. Thus, for example, certain plasticized products may be blended with the halogenated polymeric ethers on a rubber mill, and sheeted or molded articles prepared from such blends may be insolubilized by simple drying or heat treatment during the sheeting or molding process.

In the preparation of water-insensitive products, for example, films from a polyvinyl alcohol and an alpha-polyhalogenated linear polymeric ether there are apparently three stages of reaction: (1) a reaction of the polyvinyl alcohol with the halogenated polymeric ether in solution with or without heating, as evidenced by eventual gel formation; (2) reaction during the drying of the film as evidenced by the insolubility after drying of films cast from homogeneous ungelled solutions; (3) reaction during subsequent heat treatment or baking of the dried film as evidenced by a higher degree of insolubility than that attained by air drying alone at room temperature. In most cases it is preferable to carry out the initial reaction of polyvinyl alcohols with the alpha-polyhalogenated linear polymeric ethers in solution, heating for a short time at slightly elevated temperatures, e. g., up to about 60° C. until a homogeneous solution is obtained. Usually heating for a period of 5-30 minutes at 50-60° C. is sufficient, but the reaction conditions in this stage are not necessarily restricted to these limits. For practical purposes the upper temperature limit of the reaction is the boiling point of the reaction mixture, and the length of time involved is variable and need be only that sufficient to produce homogeneous solutions. Homogeneous solutions may also be obtained by stirring the polyvinyl alcohol and the chlorinated polymeric ether at room temperature for longer periods of time. These solutions may then be employed for casting or other purposes in forming articles which are later insolubilized on further reaction of the alcohol and ether.

The temperature and the length of time employed in the second and third stages of the insolubilization, namely, the drying and/or baking of the polyvinyl alcohol film may be varied widely, from 50-150° C. depending upon the degree of modification desired. Frequently, it is desirable to bake the polyvinyl articles at only slightly elevated temperatures, e. g., 60-80° C., gradually raising the temperature to 100° C. in order to avoid reaction between the polyvinyl alcohol and liberated hydrogen halide. Acid acceptors such as organic tertiary amines, e. g., pyridine, quinoline, triethylamine, or triethanolamine, or inorganic bases, e. g., sodium bicarbonate, sodium hydroxide, or sodium carbonate may be employed to neutralize the hydrogen halide liberated during the insolubilizing reaction. By the use of such acid acceptors, it is possible to coat polyvinyl alcohol on cellulosic, e. g., fabric, substrates and to insolubilize this polyvinyl alcohol with halogenated polymeric ethers without tenderizing the fabric.

Insolubilization may be obtained in varying degrees depending upon the amount of halogenated ether employed. Usually 5-15% of the latter is sufficient to obtain highly insoluble products, but the amount may vary between the limits 2-50%, depending upon the polyvinyl alcohol employed, the particular halogenated ether or its halogen content, the reaction conditions, and the degree of insolubility desired. The halogenated polymeric ether may be incorporated at any stage. For example, it may be added to a spinning dope or casting solution, or to the formed article. An unsupported film may be insolubilized by immersion in a hot bath containing the halogenated polymeric ether.

While the examples given have illustrated the formation of films, the compositions may be converted into threads or other shaped articles or may be molded, and any method well known in the art for the preparation of the articles may be used. Thus, the compositions can be cast or spun into an atmosphere designed to evaporate the solvent rapidly, or they may be cast into a suitable coagulating bath such as that disclosed in Izard and Kohn, U. S. 2,236,061, employing in either method a continuous or discontinuous operation. In forming films the composition may be cast on a heated casting surface, such as a metal wheel or a continuous belt, removing the film after the solvent or dispersing medium is evaporated. Alternatively, the films may be formed by casting the compositions on a glass plate, allowing the solvent to evaporate and then treating as in the examples given above. The films may be extruded from solution into suitable coagulating baths which are selected so as not to dissolve the halogenated polymeric ethers. It is frequently desirable to plasticize the polyvinyl alcohols in order to facilitate blending with the halogenated polymeric ethers or to produce articles possessing improved pliability. Plasticizers, which may be added for these purposes include glycerol, ethanolamine, ethanolamine hydrochloride, ethanol formamide, or ethanol acetamide. Non-hydroscopic materials may also be employed, including oils, such as linseed oil or coconut oil or esters, such as dibutyl phthalate or dibutoxyethyl sebacate.

Polymeric ethers are frequently used as plasticizers for polyvinyl alcohol. Such ethers are usually water soluble and are leached out of the film when the insolubilized or untreated film comes in contact with water. Thus, an insolubilized film plasticized with a water soluble polymeric ether is embrittled after exposure to water. This defect is substantially diminished by employing the halogenated polymeric ethers of this invention which, in addition to insolubilizing the polyvinyl alcohols exert a permanent plasticizing action. Halogenation of the ethers employed in this reaction may be controlled, for example, by interrupting the reaction at the desired point so that insolubilizing agents result which are still compatible with the polyvinyl alcohols. Films insolubilized with the halogenated polymeric ethers of this invention possess advantageous low temperature toughness and pliability at low humidities. The polymeric nature of both the polyvinyl alcohol and the insolubilizing agents aids in the formation of films, coatings, or threads, and finished articles are obtained which are permanently flexible as well as water resistant.

Polyvinyl alcohol finds many outlets where a high degree of oil or organic solvent resistance is needed as, for example, in fuel cell diaphragms, tubing, and wearing apparel, such as gloves. The insolubilized polyvinyl alcohols of this invention are also resistant to water which may be contained in oils, greases, or solvents, and articles containing these insolubilized polyvinyl alcohols are thus resistant both to water and to oils, greases, and solvents. The products produced according to this invention are transparent, insoluble in water, and relatively firm so that handling in machinery is facilitated. They may be employed in the manufacture of coated fabrics, impregnated paper or other cellulosic materials, unsupported films, or many other articles of manufacture which hitherto have not been satisfactory when based on a polyvinyl alcohol itself due to inferior resistance to water.

The alpha-polyhalogenated linear polymeric ethers prepared, for instance, as described above, are useful for a variety of purposes in addition to the modification of polyvinyl alcohol. They may be hydrolyzed and the products obtained may be used to modify proteinaceous substances. Thus, one part by weight of a product of Example C, above, may be hydrolyzed by heating to boiling in a solution of 2 parts of sodium acetate in 17.5 parts of water and adding sodium bicarbonate until added Bromcresol Green indicator remains blue in the solution, and the hydrolysis product so obtained may be used to insolubilize gelatin and to tan skins.

The above description and examples are intended to be illustrative only. Any modification of or variation therefrom which conforms to the spirit of the invention is intended to be included within the scope of the claims.

What is claimed is:

1. A process for preparing a polyvinyl alcohol resistant to water which comprises bringing a polyvinyl alcohol containing at least three hydroxyl groups per mol in contact with from 2 to 20%, by weight thereof, of an alpha-polyhalogenated macromolecular linear polymeric ether containing at least one per cent halogen and at least three halogen atoms, per mol, on alpha carbon.

2. A process for preparing useful articles which comprises forming a shaped object from a water solution of a polyvinyl alcohol containing at least three hydroxyl groups per mol and from 2 to 20%, by weight of said polyvinyl alcohol, of an alpha-polyhalogenated macromolecular linear polymeric ether containing at least one per cent halogen and at least three halogen atoms, per mol, on alpha carbon and heating said shaped object at 50–150° C.

3. A process for preparing useful articles which comprises forming a shaped object from a water solution of a polyvinyl alcohol containing at least three hydroxyl groups per mol and from 2 to 20%, by weight of said polyvinyl alcohol, of an alpha-polychlorinated macromolecular linear polymeric ether containing at least one per cent chlorine and at least three chlorine atoms, per mol, on alpha carbon and heating said shaped object at 50–150° C.

4. A process for preparing useful articles which comprises forming a shaped object from a water solution of a polyvinyl alcohol containing at least three hydroxyl groups per mol and from 2 to 20%, by weight of said polyvinyl alcohol, of an aliphatic alpha-polychlorinated macromolecular linear polymeric ether containing at least one per cent chlorine and at least three chlorine atoms, per mol, on alpha carbon and heating said shaped object at 50–150° C.

5. A process for preparing useful articles which comprises forming a shaped object from a water solution of a polyvinyl alcohol containing at least three hydroxyl groups per mol and from 2 to 20%, by weight of said polyvinyl alcohol, a chlorinated polyethylene oxide containing at least one per cent chlorine and at least three chlorines, per mol, on alpha carbon and heating said shaped object at 50–150° C.

6. A process for preparing useful articles which comprises forming a shaped object from a water solution of a polyvinyl alcohol containing at least three hydroxyl groups per mol and from 2 to 20%, by weight of said polyvinyl alcohol, a chlorinated polydioxolane containing at least one per cent chlorine and at least three chlorines, per mol, on alpha carbon and heating said shaped object at 50–150° C.

7. A reaction product of a polyvinyl alcohol containing at least three hydroxyl groups per mol and from 2 to 20%, by weight of said polyvinyl alcohol, of an alpha-polyhalogenated macromolecular linear polymeric ether containing at least one per cent halogen and at least three halogen atoms, per mol, on alpha carbon.

8. A reaction product of polyvinyl alcohol containing at least three hydroxyl groups per mol and from 2 to 20%, by weight of said polyvinyl alcohol, of an alpha-polychlorinated macromolecular linear polymeric ether containing at least one per cent chlorine and at least three chlorine atoms, per mol, on alpha carbon.

9. A reaction product of polyvinyl alcohol containing at least three hydroxyl groups per mol and from 2 to 20%, by weight of said polyvinyl alcohol, of an aliphatic alpha-polychlorinated macromolecular linear polymeric ether containing at least one per cent chlorine and at least three chlorine atoms, per mol, on alpha carbon.

10. A reaction product of polyvinyl alcohol containing at least three hydroxyl groups per mol and from 2 to 20%, by weight of said polyvinyl alcohol, of a chlorinated polyethylene oxide containing at least one per cent chlorine and at least three chlorines, per mol, on alpha carbon.

11. A reaction product of polyvinyl alcohol containing at least three hydroxyl groups per mol and from 2 to 20%, by weight of said polyvinyl alcohol, of a chlorinated polydioxolane containing at least one per cent chlorine and at least three chlorines, per mol, on alpha carbon.

12. A potentially reactive aqueous solution of a polyvinyl alcohol containing at least three hydroxyl groups per mol, said solution containing, as an insolubilizer of said polyvinyl alcohol, from 2 to 20%, by weight of said polyvinyl alcohol, of an alpha-polyhalogenated macromolecular linear polymeric ether containing at least one per cent halogen and at least three halogen atoms, per mol, on alpha carbon.

13. A potentially reactive aqueous solution of a polyvinyl alcohol containing at least three hydroxyl groups per mol, said solution containing as an insolubilizer of said polyvinyl alcohol, from 2 to 20%, by weight of said polyvinyl alcohol, of an alpha-polychlorinated macromolecular linear polymeric ether containing at least one per cent chlorine and at least three chlorine atoms, per mol, on alpha carbon.

14. A potentially reactive aqueous solution of a polyvinyl alcohol containing at least three hydroxyl groups per mol, said solution containing, as an insolubilizer of said polyvinyl alcohol, from 2 to 20%, by weight of said polyvinyl alcohol, of an aliphatic alpha-polychlorinated macromolecular linear polymeric ether containing at least one per cent chlorine and at least three chlorine atoms, per mol, on alpha carbon.

CARL WALTER MORTENSON.

REFERENCES CITED

The following references are of record in the file of this patent:

UNITED STATES PATENTS

| Number | Name | Date |
| --- | --- | --- |
| 2,119,531 | Kykstra | June 7, 1938 |